No. 768,042. Patented August 23, 1904.

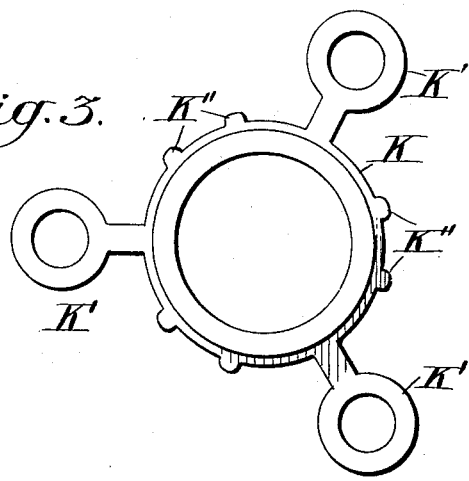
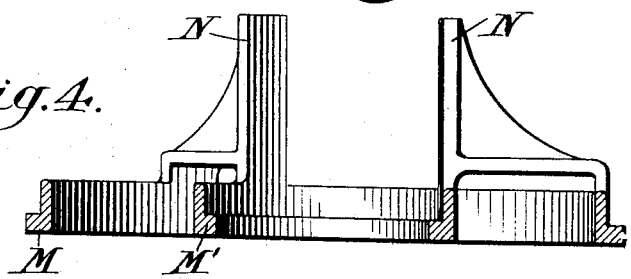
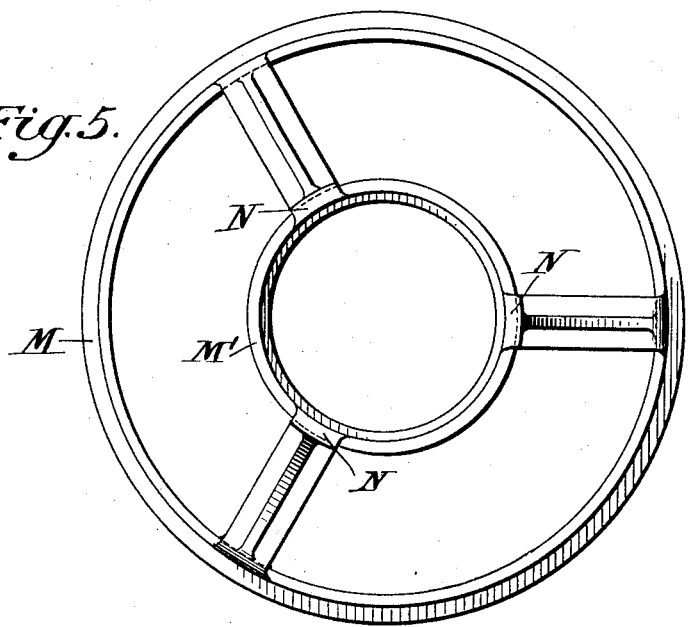

UNITED STATES PATENT OFFICE.

HENRY GABRIEL GINACA AND HANS O. C. ISENBERG, OF HONOLULU, TERRITORY OF HAWAII.

VALVE.

SPECIFICATION forming part of Letters Patent No. 768,042, dated August 23, 1904.

Application filed July 13, 1903. Serial No. 165,332. (No model.)

*To all whom it may concern:*

Be it known that we, HENRY GABRIEL GINACA and HANS O. C. ISENBERG, citizens of the United States of America, residing at Honolulu, Island of Oahu, Territory of Hawaii, have invented new and useful Improvements in Valves, of which the following is a specification.

Our invention relates to improvements in pump-valves, particularly high-pressure valves, the object of our improvements being to provide a larger working area, a shorter lift, and a more perfect joint when closed, with less friction than any valve hitherto devised, and designed so that these improvements may easily be applied to the ordinary valve with rubber disk now in use. Most of these objects were attained in a valve shown and described in Letters Patent No. 666,245, issued January 15, 1901, to Henry G. Ginaca; but as the improvements therein covered could not be applied to the ordinary valves with rubber disks heretofore used without entire replacement of the complete rubber valve by a complete new valve we have devised the improvements which are the subject of this specification.

Figure 1:
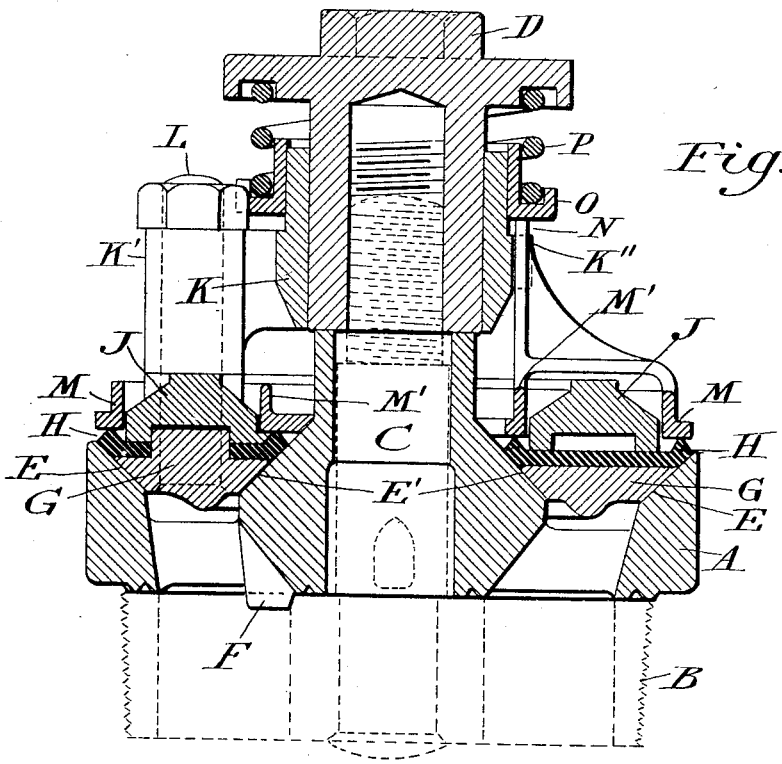
Figure 2:
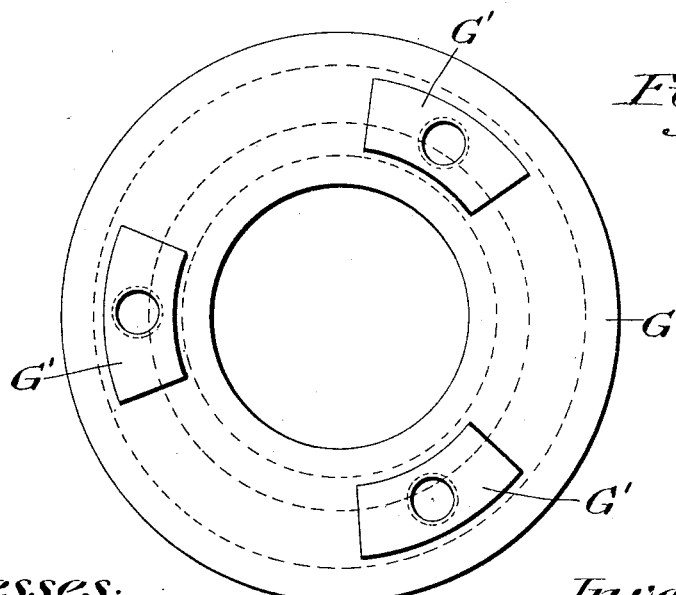

Referring to the accompanying drawings, Figure 1 represents a sectional elevation of a complete valve embodying our improvements as applied to existing casing and stem of a rubber-disk valve. Fig. 2 is a top view of the bottom part of the valve. Fig. 3 is a top view of the upper part of the valve. Fig. 4 is a vertical section through the center of the spider used in connection with said valve, and Fig. 5 is a top view of said spider.

Similar letters of reference indicate similar parts throughout the several views.

Referring to Fig. 1, A indicates the valve-casing, which surrounds the stems C and is jammed against the externally-threaded ring B of an ordinary rubber-disk valve by means of the nut D, screwed down on the upper end of the stem C. Ears F, straddling a rib of the ring B, prevents the casing A from turning about the stem C. If desired, this valve-casing A may be extended downward to replace the ring B and being externally threaded may be screwed directly into the body or barrel of the pump. The valve-seats E and E' are formed in the casing A, as shown in Fig. 1.

The valve consists of four parts G H J K, held together tightly by the studs L. The lower part of the valve G is beveled to suit the seats E E' on its under side, and on its upper surface are annular projections G, preferably three in number, as shown in Fig. 2, over which the cap J is grooved to fit. Between these parts G and J is interposed a washer H, of flexible material—such as leather, india-rubber, or something similar—said washer H being cut to fit over the projections G' and is made wide enough so as to extend some distance over the valve-seats E and E' and make joints therewith, as shown in Fig. 1. The fourth and upper part of the valve has a central sleeve K, placed outside of the nut D and capable of sliding vertically thereon. Attached to the outside of and projecting from said sleeve K are lugs K', through which bolts or studs L clamp the four parts of the valve together. This construction, it will be observed, causes the valve to be properly centered on its seats.

A spider (see Figs. 4 and 5) consisting of two concentric rings M and M', suitably connected, is placed over the washer H, the ring M being outside of and the ring M' inside of the cap J. Above the spider and forming a part thereof are vertical fingers or supports N, upon the top ends of which is placed a ring O. This ring is concentric with and fits the outside of the upper portion of the sleeve K of the valve, so that it may slide vertically thereon. The fingers N of the spider are made to fit about the sleeve K of the valve and between guides K'' thereon. Between the ring O and a flange near the upper end of the nut D is interposed a spring P for the purpose of keeping the spider down normally and causing the rings M and M' thereof to press firmly against the top edges of the flexible washer H of the valve. The spring P runs at its lower end in a circular recess or groove in the ring O and in a similar recess provided in the under side of the flange of the nut D. The parts J and K of the valve are made in separate pieces instead of one casting in order to introduce the ring M' of the spider in assembling.

The operation of the valve will now be apparent. When the piston is worked in the pump-barrel—to pump water, for example—the valve will be drawn upward by the suction caused thereby, the valve sliding by means of the sleeve K on the outside cylindrical surface of the nut D. As the valve rises the flexible washer H will be straightened out, so as to leave the bevel of the valve-seats E and E' and lay itself flat against the bottom of the rings M and M' of said spider. The valve continuing to work upward, compelled by the action of the piston combined with the pressure of the water against the valve-bottom G, the top of the valve-cap J will touch the lower surface of the connecting-ribs of the spider, when both valve and spider will go up together, the fingers N pushing up the ring O, compressing the spring P until the upper part of the sleeve of the valve butts against the lower side of the flange of the nut D. It will be noted that the water will now easily flow in two separate and almost direct paths with little friction, part passing between the valve and the valve-seat E and part between the valve and the valve-seat E'. By this construction the required lift of the valve to obtain the full working area is reduced to a minimum. Upon the reversal of the piston the valve will be pressed downward through the action of the spring on the spider combined with the back pressure of the water, the flexible portion H of said valve touching the valve-seats E and E', with the rings M and M' of the spider pressing on the marginal lips of said flexible part of the valve and forming at once water-tight joints, which are made tighter when the flexible material readjusts itself to the bevel of the valve-seats when the valve G becomes seated. A cushion effect is produced by the edges of the flexible washer H first striking the casing A in the descent of the valve, causing the valve G to seat gently.

It will be noted that these improvements may be easily applied to the casing and stem of a common rubber-disk valve or that an entire new valve embodying these improvements may be used.

Having thus described our invention, what we claim, and desire to secure by Letters Patent of the United States, is—

1. A ring B, having a fixed central stem C, combined with a valve-casing A surrounding the stem and having inner and outer seats E' and E, and a nut on the upper end of the stem for clamping the casing to the ring.

2. A ring B, having a fixed central stem C, combined with a valve-casing A surrounding the stem and having inner and outer seats E' and E, a nut on the upper end of the stem for clamping the casing to the ring, and a lug F to prevent the casing from turning on the ring.

3. The combination of a casing having inner and outer valve-seats E' and E, with a valve G, a flexible washer H, a cap J overlying the washer, and rings M and M' acting on the edges of the washer beyond the cap.

4. The combination of a fixed central stem, a casing slidable thereon, and having oppositely-inclined valve-seats E and E', a valve structure composed of the valve proper G, a flexible washer H, a cap J overlying the washer, and a spider having rings M and M', said valve parts G, H, J, K, M and M' being secured together by bolts L.

5. The combination of a valve-casing A having valve-seats E and E', lugs F to prevent the casing from turning, a valve in four parts G H J K held together by bolts L, a spider with two connected concentric rings M and M' above the flexible parts of the valve, fingers above and forming part of said spider, a ring O above the fingers N of the spider, a nut D having a flange, and a spring P interposed between said ring and flange for the purpose of pressing the rings of said spider against the marginal lips of the flexible part of said valve, substantially as described.

In testimony whereof we have signed our names to this specification in the presence of two subscribing witnesses.

HENRY GABRIEL GINACA.
HANS O. C. ISENBERG.

Witnesses:
ROBT. J. PRATT,
D. A. FOX.